(12) United States Patent
King

(10) Patent No.: US 12,389,900 B1
(45) Date of Patent: *Aug. 19, 2025

(54) AUTOMATIC ANIMAL DETECTION AND DETERRENT SYSTEM

(71) Applicant: Animal Deterrent Solutions, LLC, Marshall, TX (US)

(72) Inventor: Charles Hartman King, Birmingham, AL (US)

(73) Assignee: Western Robotics, LLC, Jackson, WY (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/369,232

(22) Filed: Sep. 18, 2023

Related U.S. Application Data

(63) Continuation of application No. 17/748,118, filed on May 19, 2022, now Pat. No. 11,793,190, which is a continuation of application No. 16/382,498, filed on Apr. 12, 2019, now Pat. No. 11,369,106.

(51) Int. Cl.
| | |
|---|---|
| *G06N 3/00* | (2023.01) |
| *A01M 29/00* | (2011.01) |
| *G06N 3/08* | (2023.01) |
| *G06V 20/52* | (2022.01) |

(52) U.S. Cl.
CPC .............. *A01M 29/00* (2013.01); *G06N 3/08* (2013.01); *G06V 20/52* (2022.01)

(58) Field of Classification Search
CPC ...... A01M 29/00; A01M 29/10; A01M 29/16; A01M 29/18; A01M 31/002; G06N 20/00; G06N 3/08; G06V 20/52; G06F 18/217; G06F 18/214
See application file for complete search history.

(56) References Cited

U.S. PATENT DOCUMENTS

| | | | | |
|---|---|---|---|---|
| 2016/0133131 | A1* | 5/2016 | Grimm | G08G 1/0141 |
| | | | | 701/117 |
| 2019/0166823 | A1* | 6/2019 | Dick | G06F 18/24133 |
| 2019/0246623 | A1* | 8/2019 | Tews | A01M 31/002 |
| 2021/0324832 | A1* | 10/2021 | Wenger | G06V 40/103 |

* cited by examiner

*Primary Examiner* — Pakee Fang
(74) *Attorney, Agent, or Firm* — Lanier Ford Shaver & Payne, P.C.; Gerald M. Walsh

(57) ABSTRACT

This disclosure provides a method of detecting and deterring a target animal from a target area. A target area is positioned within the field of vision of a video camera connected to a computer processing system. An animal identification computer program using convolution neural networks and deep learning computer programs and camera images rapidly detects a target animal. The animal identification computer program is trained to identify target animals accurately using a learning algorithm and related machine learning technology. The time to deploy a deterrent against a target animal from the instant of detection is 2 seconds or less so that little or no time is available to the target animal to damage the target area.

6 Claims, 4 Drawing Sheets

AUTOMATIC ANIMAL DETECTION AND DETERRENT SYSTEM

CROSS REFERENCE TO RELATED APPLICATIONS

This patent application is a continuation of, and claims the benefit of, U.S. patent application Ser. No. 17/748,118, currently pending, which is a continuation of, and claims the benefit of U.S. Pat. No. 11,369,106 and which are hereby incorporated herein by reference in their entirety.

FIELD OF THE INVENTION

This invention relates to methods and systems for deterring animals from entering specific areas and, more particularly, to methods and systems that use video object detection using machine learning on a neural network and type identification training to quickly, accurately, and automatically detect and deter an intruding animal in a given location.

BACKGROUND OF THE INVENTION

It has been desirable to exclude animals from a particular area. Pets, such as dogs and cats, etc. have been known to cause harm to furnishings, plants and other objects by scratching, lying upon, and in general having access to such objects.

Predators such as coyotes are known to attack and kill pets such as dogs. Marine animals such as birds and sea lions are known to perch or lie upon ocean craft in harbors and to soil and foul the surfaces of these craft. To combat such unwanted behavior, devices are known to detect the presence of these animals and deter them by producing a stimulus which startles or scares the animal. These deterring stimuli can include the spraying the animal with water, emitting sounds, or flashing lights, or combinations thereof. U.S. Pat. Nos. 4,658,386; 7,278,375; 7,462,364; 9,044,770; 9,204,622; and 9,226,493 disclose various methods and systems to detect and deter animals from entering a specified area. All of these methods and systems use infra-red motion detection systems to detect the presence of the animals. Motion detection has not been reliable and can lead to false positives and negatives. Motion detectors cannot distinguish between humans and non-human animals.

China Patent Application Publication No. CN202476328 discloses an airport laser bird repelling system based on image recognition (classification). A motion detection module firstly uses the images of a front frame and a rear frame of a video stream as differential, so as to find an object in motion. A bird identification module is the used for identifying the image morphology of all the moving objects. When the characteristic of the image changes regularly, namely the movement of the flying bird wings, the object is considered as "birds". A movement tracking module tracks the "birds" by using a tracking algorithm. A position parameter generating module is used for converting the cartesian coordinate system position information on the image into polar coordinate system information, namely the distance from the center of the image and the rotation angle around the initial axis. Pulse width modulated waves are generated for rotating a steering engine by using a discrete proportional integral derivative algorithm according to the information. The pulse width modulated wave signals are transmitted to the steering engine so that the steering engine can align the flying birds to the center of the camera. An instruction is then sent to a laser generator to emit lasers to frighten the birds away. Although this use of video image recognition may improve upon detection of only motion, object recognition via morphology is relatively slow, complex, inaccurate, and imprecise.

SUMMARY OF THE INVENTION

This invention provides a method of detecting and deterring a target animal from a target area. The target area is placed within the field of vision of a camera which is connected to a computer processing system. An animal identification computer program is run using convolution neural networks and deep learning computer programs with camera images from the camera to detect a target animal in the target area. It is verified whether a target animal is in the field of view of the camera. If the target animal is in the field of view of the camera the target animal is recorded with the camera. One or more deterrents are aimed at the target animal and a target location is set. The deterrent is deployed to cause the target animal to leave the target area.

The recording is stopped after the deterrent is deployed, and the recording is saved to a file in the computer. If the target animal has not left the target area after deploying the deterrent the process is repeated. Verification whether a target animal is in the field of vision of the camera is performed continuously until a target animal is in the field of view of the camera. The animal identification computer program is, preferably, trained to identify target animals using a learning algorithm which involves training the learning algorithm with training data sets. The training of the learning algorithm with training data sets is validated with validation data sets. The training data sets and the validation data sets are created by gathering target animal image data in a target area, building image data sets for target animals and for target areas from the image data, and annotating or labeling images in the data sets so that the data sets may be entered into the learning algorithm.

An advantage of the method of the present invention is detecting target animals of specific species from a target area using convolution neural networks and deep learning technology to identify animal targets rapidly.

Another advantage is video camera identification of a target animal regardless of the background of the video.

Another advantage is the use of machine learning technology to provide highly accurate identification of target animals with few or no false positives.

Another advantage is the ability to deploy a deterrent against a target animal within 0.25 to 2 seconds from the instant of detection so that little or no time is available to the target animal to damage the target area.

DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
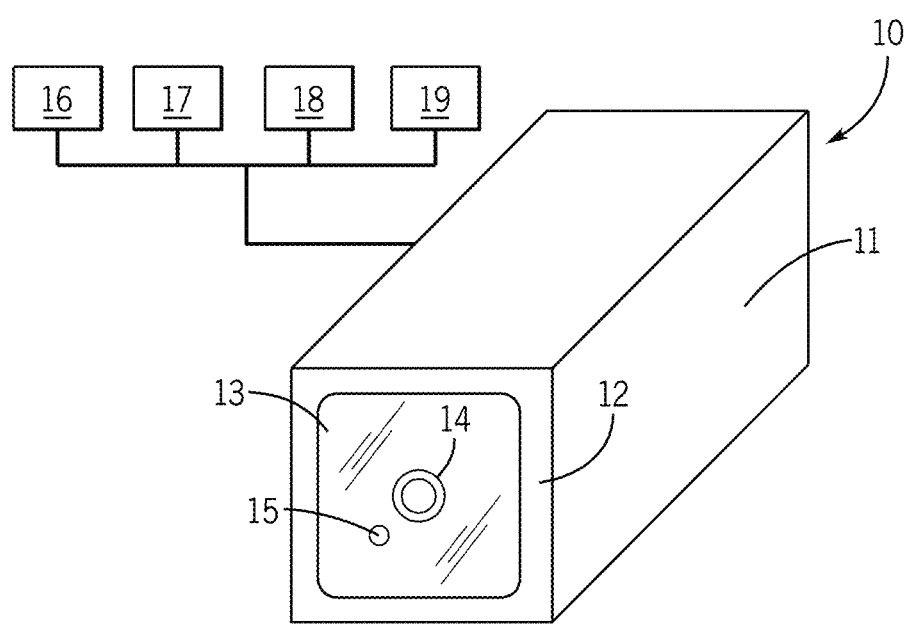
FIG. 1 shows a perspective view of the exterior of an automatic animal detection and deterrent system of the present invention.

FIG. 1 shows a perspective view of the exterior of the automatic animal detection and deterrent system 10 of the present invention, which is contained in housing 11 having a front end 12 with a clear viewing window chamber 13. A video camera lens 14 is shown inside the clear viewing window chamber 13. A photovoltaic sensor (PV) 15 may also be contained within the clear viewing window chamber 13 to indicate day time or night time. The electrical components of the housing 11 may be connected to a solar panel 16 and to a plurality of animal deterrent devices 17, 18, and 19.

Figure 2:
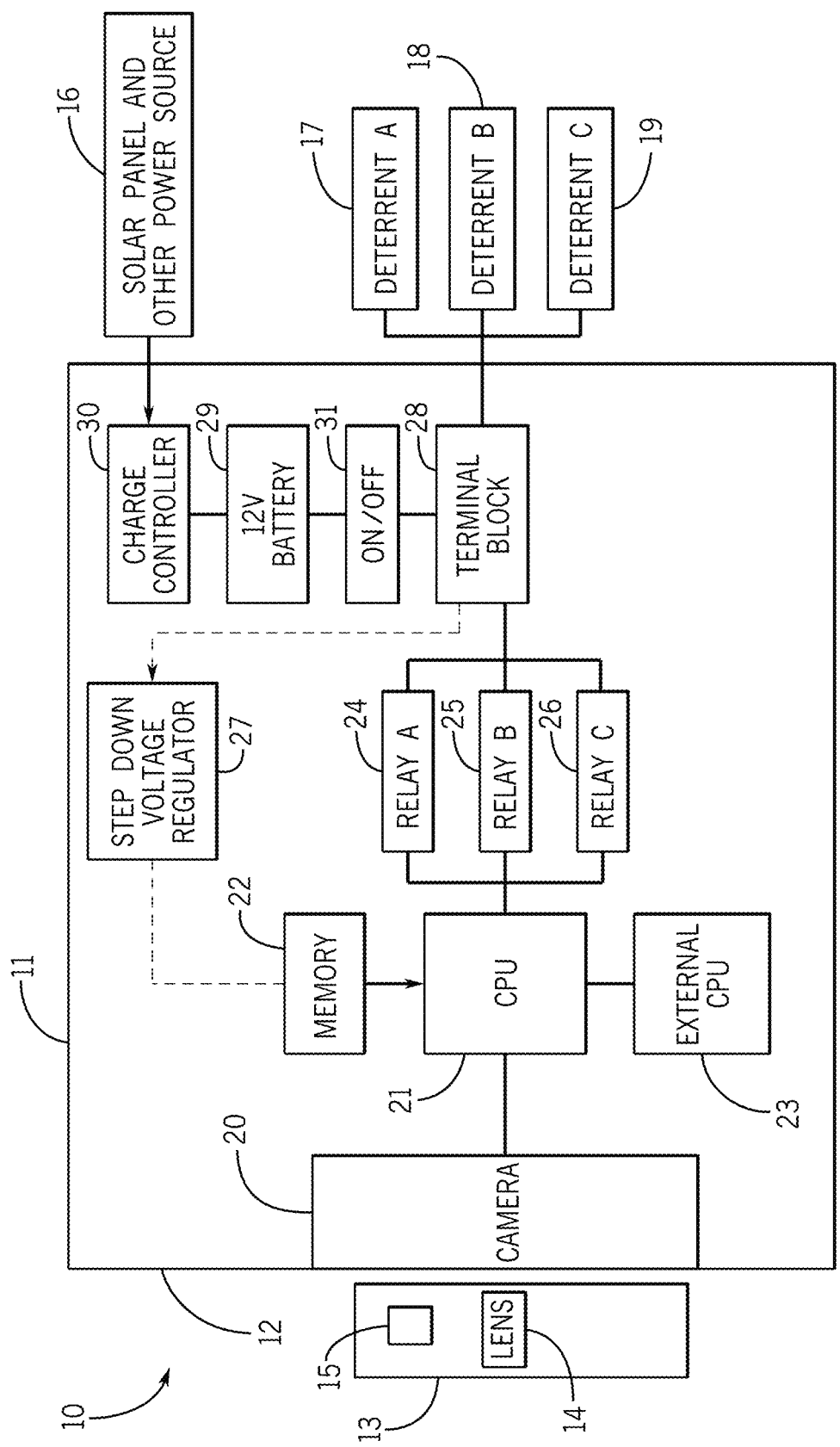
FIG. 2 is a diagram of the electro-mechanical components of the automatic animal detection and deterrent system.

FIG. 2 is a diagram of the electrical components inside the housing 11. The lens 14 and the PV sensor 15 in the window chamber 13 are connected to the video camera 20 inside the housing 11. The camera 20 is attached to a central processing unit (CPU) 21 having a memory chip 22 which can collect data for datasets and store recordings from triggers. An external computation virtual processing unit (VPU) 23 is connected to the central processing unit 21, preferably by a USB connection. The VPU is a hardware accelerator for deep neural network inferences to improve edge detection. The CPU 21 is connected to a plurality of relays 24, 25, and 26 to transfer high voltage to the corresponding plurality of animal deterrents 17, 18, and 19. The CPU 21 receives power through a voltage regulator 27 which receives power through a terminal block 28 from a battery 29. A charge controller 30 is connected to the battery 29 and to the terminal block 28 through an on/off switch 31. The charge controller 30 may receive power from the solar panel 16 or other external sources of electrical power.

The video camera 20 monitors a specified area from which a user desires to deter unwanted animals. Data from the video camera 20 is transmitted to the central processing unit 21 which runs an animal identification program and controls all deterrent functions. The CPU 21 can identify an unwanted animal of interest in the specified area, target the unwanted animal in the specified area, and deploy a deterrent to the unwanted animal which will cause the unwanted animal to leave the specified area. The memory chip 22 contains identification and execution programs and stores recorded images of unwanted animals that are deterred. The external central processing unit 23 assists in running computations and increases the performance of the CPU 21. The relays 24, 25, and 26 transfer necessary voltage to the animal deterrents 17, 18, and 19, respectively, for example. The animal deterrents, without limitation, can be sound devices, such as horns, sirens, and ultrasonic sound; light devices, such as flashing lights, strobe lights and laser lights; water spray devices, such as sprinklers, hoses, and water cannons; and compressed air used with projectiles, such as sand.

The voltage regulator automatically adjusts voltage from the battery 29 to power the CPU 21 and the VPU 23. The terminal block 29 distributes power from the battery 29 to the various electrical components in the system. The charge controller 31 controls and balances charging levels to protect the battery 29 and other electrical components from electrically overloading or underloading.

The present invention uses convolution neural networks and deep learning technology known in the art as a means of identifying animal targets for deterring. The technology allows identification of a specific species. There are several commercially available pre-trained object detection models, but they are insufficient for detecting an animal. It is essential that the target animal can be identified in the video regardless of the background of the video so that identification can occur quickly before the target animal can do any damage. A large collection of images of targeted animals is obtained in a given environment. A large collection of images of a given environment with no targeted animals therein is also obtained. Using machine learning technology, a set of characteristics are discovered that allow identification of a target animal. The identification is practically in real time with few false positives and is specific to an animal species.

Figure 3:
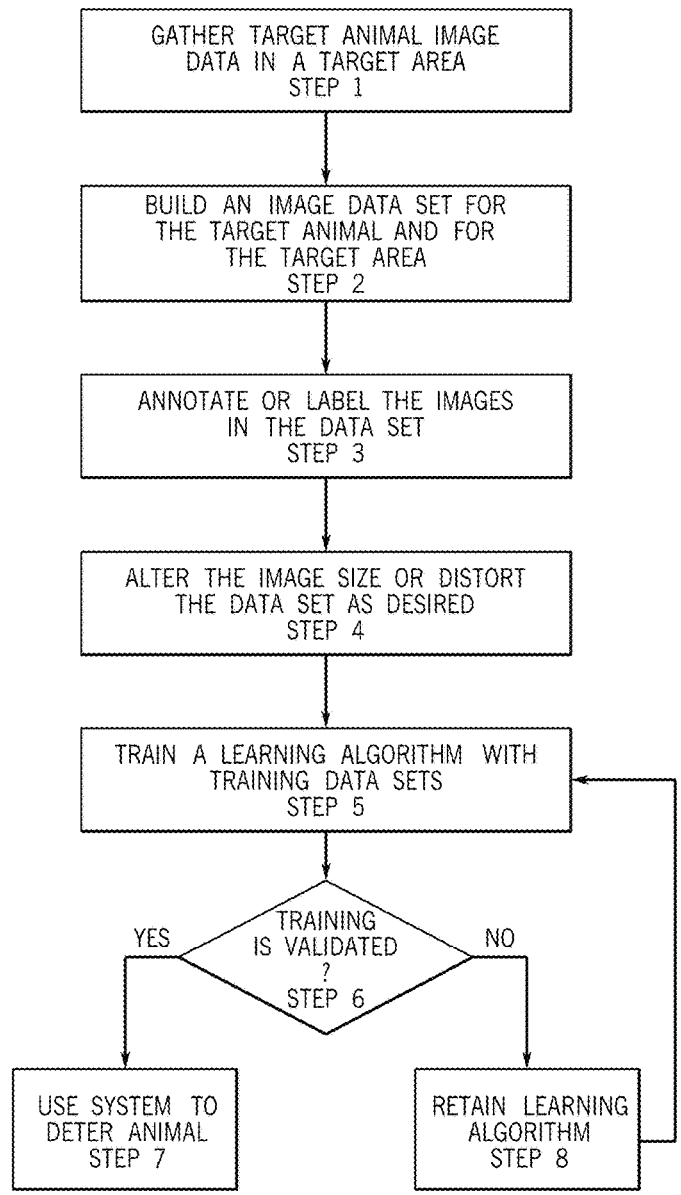
FIG. 3 is a flow chart of the method of training the automatic animal detection and deterrent system to detect objects using object detection through machine learning on a neural network.

FIG. 3 is a flow chart of a method of training the automatic animal detection and deterrent system to detect target animals. The training process can begin with gathering target animal image data, preferably in an area where a camera will be deployed a (STEP 1). An image data set is built for the target animal in the specific area (STEP 2). Preferably, image data is gathered at different times of the day using different image recording devices, and in different locations where a camera may be deployed. Images in the data sets are annotated or labeled by methods known in the art so that the data sets may be entered into a standard learning algorithm (STEP 3). The image size may be changed to model input parameter size. Distortion can be made to the data set to add more data for training (STEP 4). The images may be divided into different sets for training, validation, and/or testing. The algorithm is then trained on a training data set (STEP 5). Any known suitable learning algorithm may be used as desired. The training results are evaluated on a validation data set (STEP 6). If validation results are acceptable the animal detection and deterrent system is ready to use (STEP 7). If the validation results are unacceptable the learning algorithm is retrained (STEP 8). Any new image data can be added to an existing database for any animal target.

Figure 4:
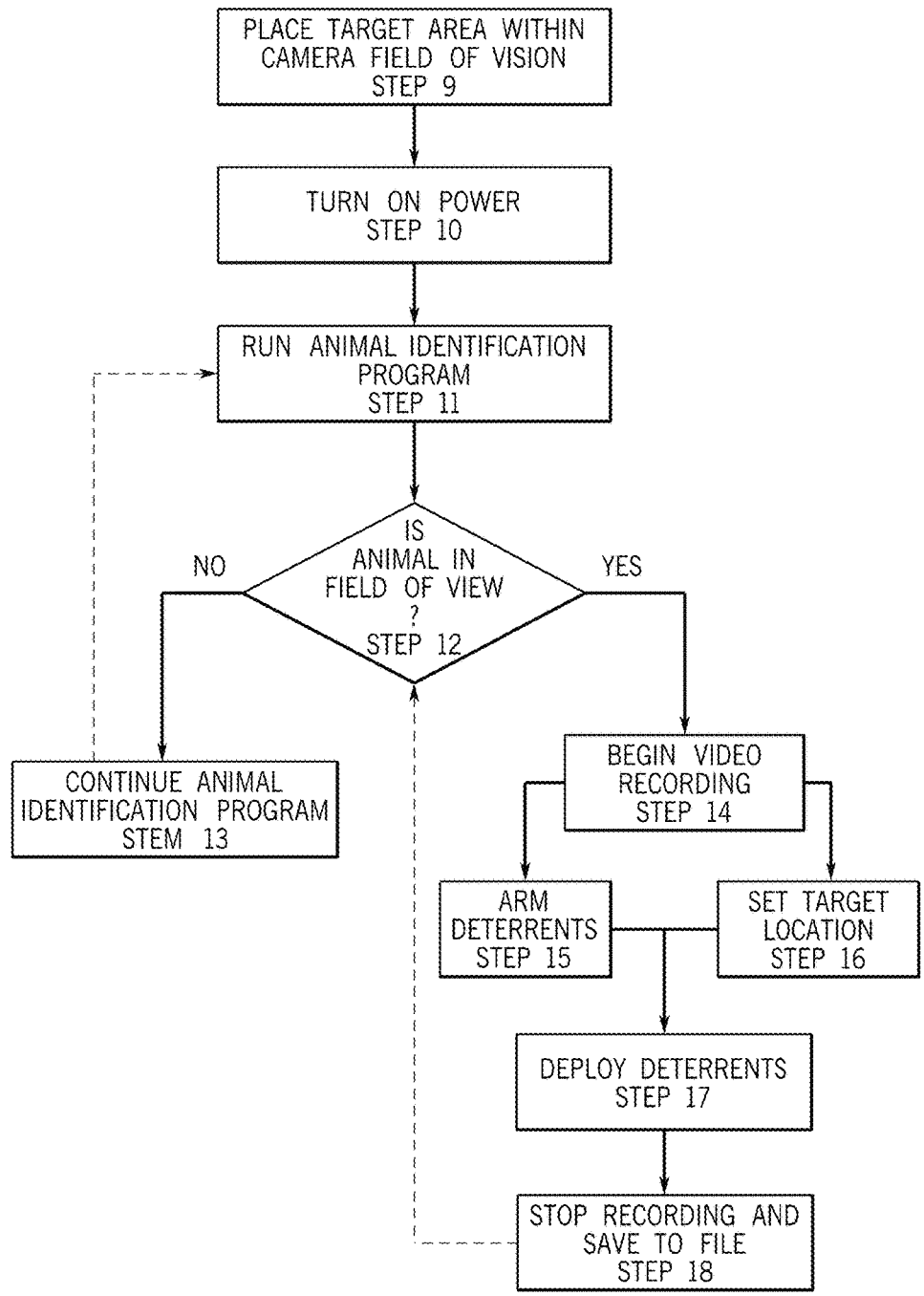
FIG. 4 is a flow chart of the steps of the method of the present invention for automatic detection and deterring of animals.

FIG. 4 is a flow chart of the steps of the method of the present invention for automatic detection and deterring of animals. Once the automatic animal detection and deterrent system has been preprogrammed with the training sequence for one or more target animals it can be placed in a running mode. The unit 10 is placed where it can monitor a target area wherein the target area is within the field of vision of the video camera (STEP 9). The unit 10 is turned on (STEP 10) and the animal identification software program is running (STEP 11). Images received by the video camera are transmitted to the CPU which is programmed with a scanning identification algorithm that scans the real time video images for the pre-programmed target animal of interest. The scanning continues until the target animal is in the field of view and the target animal image is identified by the program (STEP 12). The video images can be recorded if desired (STEP 14) while the deterrents are prepared for activation (STEP 15) and the target location is identified (STEP 16). One or more deterrents are then activated (STEP 17) and video recording is stopped (STEP 18) and saved to memory. The program scans the video images to verify the presence or absence of the target animal (STEP 12). If so, STEPS 14-18 are repeated. If not, the animal identification program is continued (STEP 13) to monitor the presence or absence of the target animal. The time between detection and deterrence is sub seconds or only a few seconds, for example, 0.25 to 2 seconds, which is sufficient to deter the target animal so that little or no damaged is produced by the target animal.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the system can be programmed and monitored with any suitable computer or related device, including, for example, cell phones. The system can be pre-programmed (trained) to identify and deter as many animal types as desired. Specific individual humans can be identified as known or unknown. A plurality of different deterrents can be deployed at the same time when a target animal is detected. Any type of camera can be used, including an IP camera. Multiple cameras can be used on one CPU. Connections to solar panels and deterrent devices may be wireless. Every trigger video as it happens, and/or daily summary of activity can be transmitted wirelessly via a cell network.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A method of detecting and deterring a target animal from a target area, comprising:
    1) placing the target area within the field of vision of a camera, wherein the camera is connected to a computer processing system;
    2) running an animal identification computer program with camera images from the camera to detect a target animal;
    3) training the animal identification computer program to identify target animals using a learning algorithm;
    4) deploying a deterrent to cause the target animal to leave the target area within 2 seconds from the instant of detection; and
    5) repeating step 4) if the target animal has not left the target area after deploying the deterrent,
    wherein convolution neural networks and deep learning computer programs with the camera images are used to detect the target animal,
    wherein the target animal in the field of view of the camera is verified,
    wherein one or more deterrents are armed, and a target location is set, and
    wherein the species of the target animal is identified.

2. The method of claim 1, further comprising recording the target animal with the camera in the field of view of the camera.

3. The method of claim 1, wherein the deterrent is a sound device, a light device, a spray device, projectiles, or combinations thereof.

4. A method of detecting and deterring a target animal from a target area, comprising:
    1) placing the target area within the field of vision of a camera, wherein the camera is connected to a computer processing system;
    2) running an animal identification computer program with camera images from the camera to detect a target animal;
    3) training the animal identification computer program to identify target animals using a learning algorithm;
    4) verifying the target animal in the field of view of the camera;
    5) recording the target animal with the camera if the target animal is in the field of view of the camera;
    6) arming one or more deterrents and setting a target location;
    7) deploying the deterrent against the target animal within 2 seconds from the instant of detection; and
    8) repeating step 7) if the target animal has not left the target area after deploying the deterrent,
    wherein convolution neural networks and deep learning computer programs with the camera images are used to detect the target animal, and
    wherein the species of the target animal is identified.

5. The method of claim 4, wherein the deterrent is a sound device, a light device, a spray device, projectiles, or combinations thereof.

6. A method of detecting and deterring a target animal from a target area, comprising:
    1) placing the target area within the field of vision of a camera, wherein the camera is connected to a computer processing system;
    2) running an animal identification computer program with camera images from the camera to detect a target animal;
    3) training the animal identification computer program to identify target animals using a learning algorithm;
    4) verifying the target animal in the field of view of the camera;
    5) recording the target animal with the camera if the target animal is in the field of view of the camera;
    6) identifying the species of the target animal;
    7) arming one or more deterrents and setting a target location, wherein the deterrent is a sound device, a light device, a spray device, projectiles, or combinations thereof;
    8) deploying the deterrent against the target animal within 2 seconds from the instant of detection; and
    9) repeating step 8) if the target animal has not left the target area after deploying the deterrent,
    wherein convolution neural networks and deep learning computer programs with the camera images are used to detect the target animal.

* * * * *